(12) United States Patent
Walz

(10) Patent No.: US 7,096,563 B2
(45) Date of Patent: Aug. 29, 2006

(54) MACHINING DIFFERENTIAL HOUSINGS

(75) Inventor: Jürgen Walz, Frickenhausen (DE)

(73) Assignee: EMAG Holding GmbH, Salach (DE)

( * ) Notice: Subject to any disclaimer, the term of this patent is extended or adjusted under 35 U.S.C. 154(b) by 219 days.

(21) Appl. No.: 10/784,463

(22) Filed: Feb. 23, 2004

(65) Prior Publication Data

US 2004/0226154 A1    Nov. 18, 2004

(30) Foreign Application Priority Data

Feb. 24, 2003  (DE) ................................ 103 07 977

(51) Int. Cl.
*B23P 23/00* (2006.01)
(52) U.S. Cl. .................... 29/558; 29/563; 409/143; 409/232
(58) Field of Classification Search .......... 29/557–558, 29/559, 563, 406; 409/143, 131–132, 232; 408/1 R
See application file for complete search history.

(56) References Cited

U.S. PATENT DOCUMENTS

| | | | | |
|---|---|---|---|---|
| 2,372,913 | A * | 4/1945 | Schmidt | 409/143 |
| 3,389,454 | A * | 6/1968 | Sattler | 29/558 |
| RE26,770 | E * | 1/1970 | Lemelson | 29/33 P |
| 4,706,371 | A * | 11/1987 | McMurtry | 483/14 |
| 4,724,599 | A * | 2/1988 | Corkin | 29/557 |
| 5,207,749 | A * | 5/1993 | Ariyoshi | 409/143 |
| 5,232,317 | A * | 8/1993 | Peuterbaugh | 407/40 |
| 5,361,485 | A * | 11/1994 | Baudermann | 29/563 |
| 5,699,598 | A * | 12/1997 | Hessbruggen et al. | 29/27 C |
| 5,781,983 | A | 7/1998 | Gruner | |
| 6,183,404 | B1 | 2/2001 | Deufel | |
| 6,220,794 | B1 * | 4/2001 | Calamia et al. | 407/40 |
| 6,722,826 | B1 * | 4/2004 | Cavanaugh | 409/143 |
| 6,826,821 | B1 * | 12/2004 | Geiger et al. | 29/563 |
| 6,832,433 | B1 * | 12/2004 | Kramer | 29/558 |

FOREIGN PATENT DOCUMENTS

| | | |
|---|---|---|
| DE | 37 22 180 | 1/1989 |
| DE | 41 42 121 | 6/1993 |
| DE | 44 22 416 | 1/1996 |
| DE | 197 16 491 | 10/1998 |
| JP | 64-71606 A * | 3/1989 |
| WO | 02/ 00390 | 1/2002 |
| WO | WO 02/00390 | 1/2002 |

* cited by examiner

*Primary Examiner*—Erica Cadugan
(74) *Attorney, Agent, or Firm*—Andrew Wilford

(57) ABSTRACT

A grab picks up a hollow workpiece and displaces it to a machining station where, while the workpiece is held in the grab, a tool is engaged from outside with a first surface of the workpiece to finish the first surface. Then the workpiece is reoriented by the grab and engaged by a tool with a second surface of the workpiece to finish the second surface. Another tool is fitted through a large-diameter hole of the workpiece and positioned inside the workpiece adjacent a small-diameter hole and a drive spindle is coupled through the small-diameter hole to the other tool to machine an inner surface of the workpiece adjacent the small-diameter hole. These steps are then repeated to finish another interior surface of the workpiece adjacent another small-diameter hole. Finally the workpiece is displaced from the machining station and released from the grab.

6 Claims, 5 Drawing Sheets

MACHINING DIFFERENTIAL HOUSINGS

FIELD OF THE INVENTION

The present invention relates to a method of an apparatus for machining a complex workpiece. More particularly this invention concerns the machining of the holes and surfaces of a differential housing.

BACKGROUND OF THE INVENTION

A standard differential housing is a massive hollow casting that is formed with several holes of different diameters aligned normally on a plane at 90° to each other. Internally it has other surfaces that must be machined to perfectly planar or part-spherical shapes. All of this machining must be done to a very high precision to accommodate the various shafts and gears that are eventually installed in the housing.

In the classic system for doing this, described in German patent document 41 42 121 of A. Baudermann the workpiece is moved from machining station to machining station and is clamped at each station as it is worked on there, typically by accurately boring out and grinding the holes which extend to the exterior and by milling interior surfaces, normally around the holes. Such a method is very slow and makes it quite difficult to align the various holes and surfaces perfectly with one another.

Various other methods and systems are described in WO 02/00390 of P. Modig, German patent 37 22 180 of H. Ullmann, and U.S. Pat. No. 5,781,983 of M. Gruner. All these methods involve handing the workpiece off from one holder to another and complex positioning systems for the workpiece and the tools working on it. In every system the accuracy of the relative positions of the various machined surfaces is often not satisfactory.

Another system described in U.S. Pat. No. 6,183,404 of K. Deufel employs a tool comprised of a drivable spindle and a cutter or grinder couplable to the spindle. The spindle is poked through a small-diameter hole in a hollow workpiece and an automated gripper can engage underneath the workpiece to fit the cutter/grinder to the spindle so that an interior surface of the workpiece can be finished. Such a special-duty system has only limited applicability and requires that the workpiece be shifted from station to station, in each of which it is held by a separate gripper, in order to work on other surfaces or holes in the workpiece.

OBJECTS OF THE INVENTION

It is therefore an object of the present invention to provide an improved system for machining a complex workpiece such as a differential housing.

Another object is the provision of such an improved system for machining a complex workpiece such as a differential housing which overcomes the above-given disadvantages, that is which is efficient and which produces a workpiece whose machined surfaces are very accurately relatively positioned.

SUMMARY OF THE INVENTION

A grab picks up from a transfer station a hollow workpiece having a plurality of small-diameter throughgoing holes and at least one large-diameter hole and displaces the workpiece from the transfer station to a machining station. Thereafter, while the workpiece is held in the grab, a tool is engaged from outside with a first exterior surface of the workpiece to finish the first exterior surface. Then the workpiece is reoriented by the grab and engaged by a tool with a second exterior surface of the workpiece offset from the first exterior surface to finish the second exterior surface. Another tool is fitted through the large-diameter hole of the workpiece and positioned inside the workpiece adjacent one of the small-diameter holes and a drive spindle is coupled through the one small-diameter hole of the workpiece to the other tool to machine an inner surface of the workpiece adjacent the one small-diameter hole with the other tool. These steps are then repeated to finish another interior surface of the workpiece adjacent another of the small-diameter holes. Finally the workpiece is displaced from the machining station back to the transfer station and released from the grab.

Thus with this system the workpiece can be exactly positioned and its surfaces, both exterior and interior, can be exactly machined, it being understood that the term "exterior" merely refers to a surface that extends to the exterior and that is readily accessible for machining purposes from the exterior. The tools necessary to do the interior machining are fitted into the workpiece with the drive spindle to ensure that these interior surfaces are finished automatically but to the same high degree of precision as the exterior surfaces, which can in fact be the generally cylindrical walls of small-diameter holes.

According to the invention the workpiece is rotated about an axis through about 90°. This makes it possible to drill out the four coplanar but perpendicular holes of a differential housing to a very high degree of accuracy.

According to the invention a tailstock is engaged through another of the small-diameter holes with the other tool after coupling of the other tool to the drive spindle to brace the other tool. In this manner the other tool is very solidly held during both sides during internal machining, something that is important since normally the internal machining entails large surface areas that are hard to machine accurately.

The apparatus according to the invention has a main slide moveable perpendicular to a rotation axis of the drive spindle and a carriage on the main slide that can move parallel to this axis so that the tool is rotated while the workpiece is moved axially, thereby ensuring high accuracy. The tailstock is movable axially of the drive spindle.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
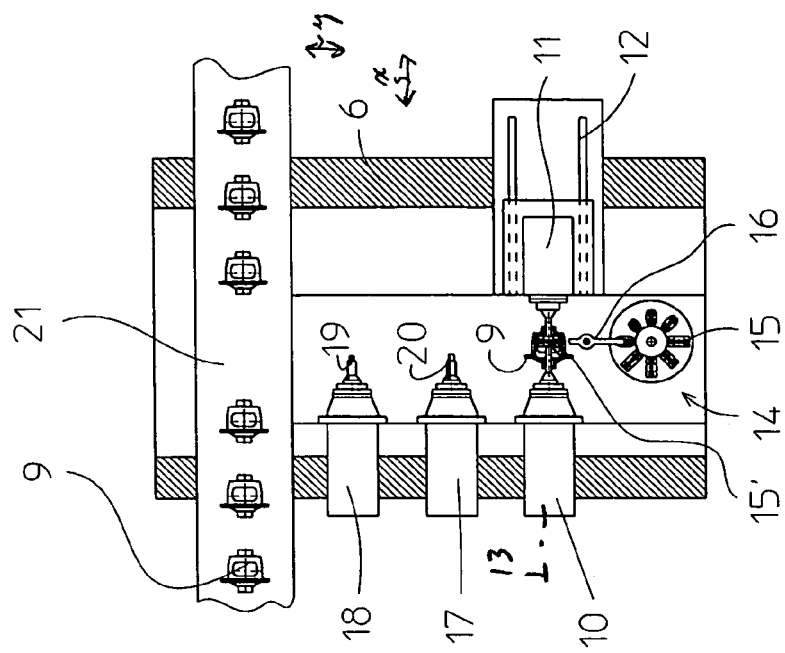
FIG. 2 is a small-scale horizontal section taken along line II—II of FIG. 1.
Figure 1:
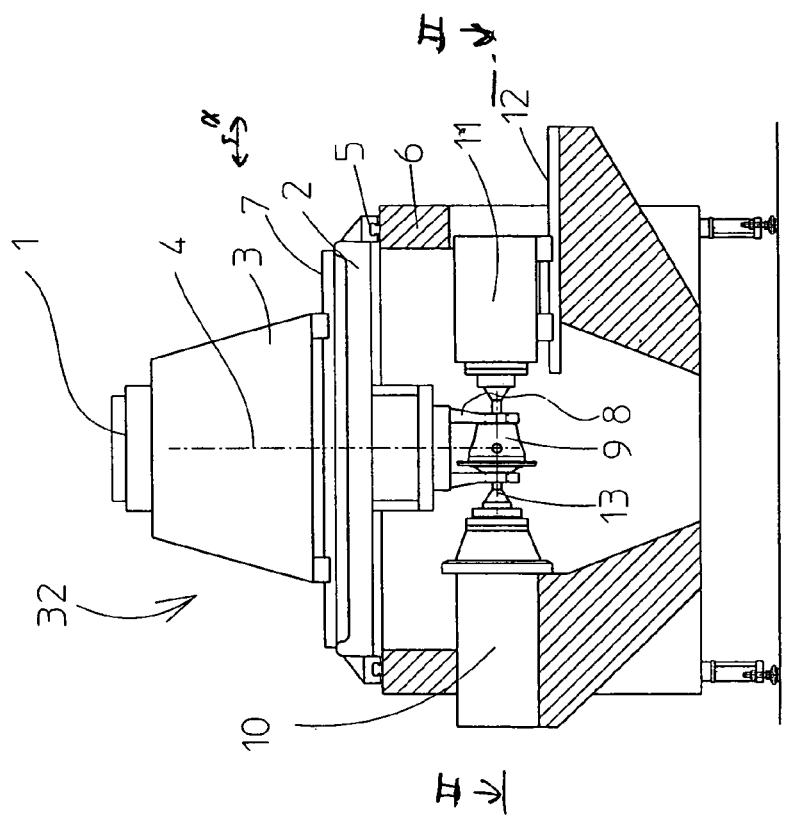
FIG. 1 is a vertical section through a machine for carrying out the method of this invention.

As seen in FIGS. 1 and 2 a drive 1 centered on a vertical axis 4 is carried on a cross slide or carriage 3 displaceable on rails 7 in a horizontal direction x. These rails 7 in turn are carried on a main slide 2 movable in a horizontal direction y perpendicular to the direction x on rails 5 carried on a stationary machine base 6 that extends from a conveyor 21 past three stationary machining stations defined by spindle tool drives 10, 17 and 18 having parallel rotation axes extending horizontally parallel to the direction x. The carriage 3 carries a two-arm grab 8 capable of picking up and dropping off workpieces 9 from the conveyor 21 and rotatable by the drive 1 about the axis 4. A tool changer 41 is also carried on the drive 1 for movement along the axis 4.

The tool drive 10 is associated with a tailstock 11 displaceable on rails 12 in the direction x toward and away from the drive 10. The drive 18 carries a double boring tool 19 and the drive 17 carries a double grinding tool 20. The drive 10 is shown holding a tool 15', but can also be fitted with tools 15 mounted on a tool carousel 14 and displaceable into and out of the drive 10 by a tool changer 16. The drive 10 and the tailstock 11 are centered on a common axis 13 parallel to the direction x.

The machine described above is used on a workpiece 9 best shown in FIGS. 3a–3c, 5, 6 and 8. This workpiece 9 has a pair of large-diameter and aligned end bores or holes 27 and 31, a pair of small-diameter side bores or holes 29 and 30 that are axially aligned with each other but perpendicular to the end holes 27 and 31, and a pair of large-diameter ports 35 and 43 (FIG. 8) axially aligned with each other but perpendicular to the side and end holes 27–31. Internally the workpiece 9 needs to be provided with part-spherical seats 37 at the side holes 29 and 30 and planar faces 42 at the end holes 27 and 31, and the holes 27, 29, 30, and 31, which are referred to below as "exterior" surfaces since they extend to the exterior of the workpiece 9, need to be bored out and smoothed. The workpieces 9 are delivered as raw castings to an input station at the end of the base 6 and are carried off as finished parts after the above-described holes 27–31 and surfaces 37 are machined by the same conveyor 21 which moves parallel to the direction x.

This system works as follows:

To start with as shown in FIG. 2 the main slide 2 is moved in direction y to position the carriage 3 above the conveyor 21 and the grab 8 picks up one of the workpieces 9. The port 35 is open downward and the axes of the holes 27–31 lie in a horizontal plane.

Figure 3A:
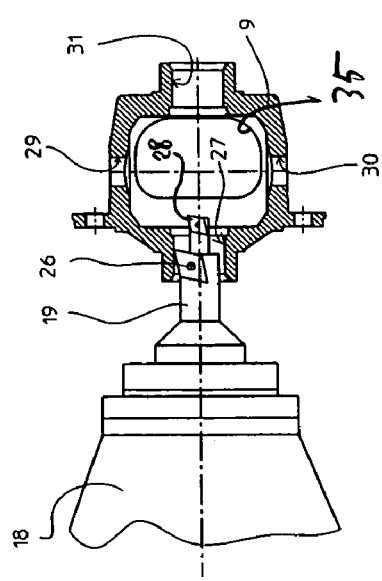
FIGS. 3a and 3b show the boring out of two adjacent holes in a workpiece in a view from above.

Then as shown in FIG. 3a the main slide 2 moves back oppositely in the direction y to align the large-diameter hole 27 with the tool 19. The carriage 3 is shifted in the direction x while the tool 19 is rotated about its horizontal axis so that a large-diameter cutter 26 on the tool 19 can bore out and true this hole 27.

Figure 3B:
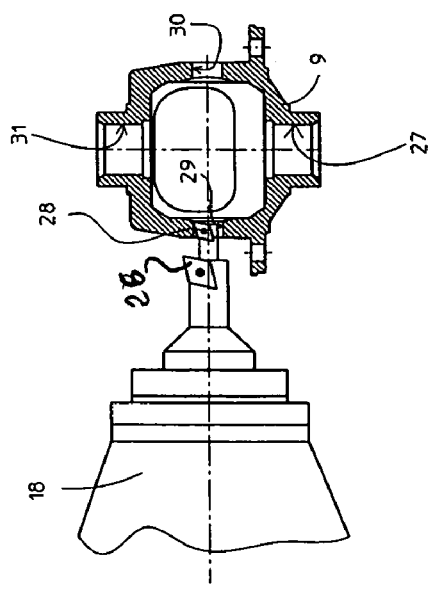

The carriage 3 is backed off and as shown in FIG. 3b the drive 1 rotates the grab 8 and the workpiece 9 through 90° about the vertical axis 4 to align the small-diameter hole 29 with the tool 19 and the carriage 3 is again shifted in the direction x while the tool 19 is rotated so that a small-diameter cutter 28 at the end of the tool 19 can bore out and true this hole 29.

These last two steps are repeated for the holes 31 and 30.

Figure 4A:
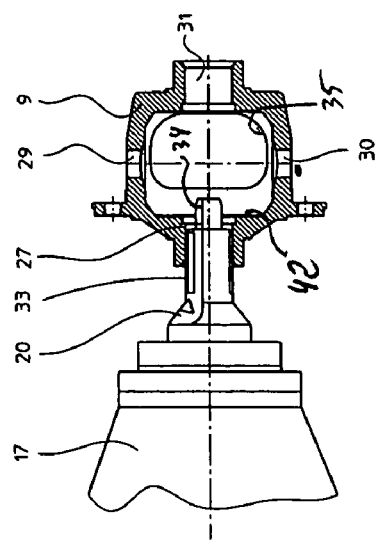
FIGS. 4a and 4b show the finish grinding of two adjacent holes in the workpiece in a view from above.

Then as shown in FIG. 4a the main-slide 2 is advanced again in the direction y to align the hole 27 with the tool 20. The carriage 3 is shifted in the direction x while the tool 20 is rotated so that a large-diameter grinder 33 on the tool 20 can smooth this hole 27.

Figure 4B:
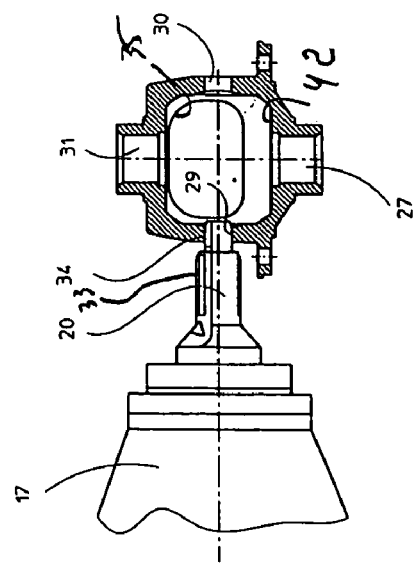

The carriage 3 is backed off and as shown in FIG. 4b the drive 1 rotates the grab 8 and the workpiece 9 through 90° about the vertical axis 4 to align the small-diameter hole 29 with the tool 20 and the carriage 3 is again shifted in the direction x while the tool 20 is rotated so that a small-diameter grinder 34 at the end of the tool 20 can smooth this hole 29.

These last two steps are repeated for the holes 31 and 30.

Then according to the invention the main slide 2 is advanced again in the direction y to align the hole 29 with the spindle 10 and the hole 30 with the tailstock 11. The tool changer 16 (FIG. 2) then picks a tool 15 out of the carousel 14, fits it through the large-diameter hole or port 35, and couples its shaft 36 through the hole 29 with the spindle 10. The tool changer 41 reaches down through the port 43 and cooperates with the changer 16 to hold the tool 15 in position, that is aligned with the axis of the shaft 36, and in fact this tool changer 41 can reach down clear through both ports 35 and 43 of the workpiece 9 to pick up a tool 15 below it.

Figure 5:
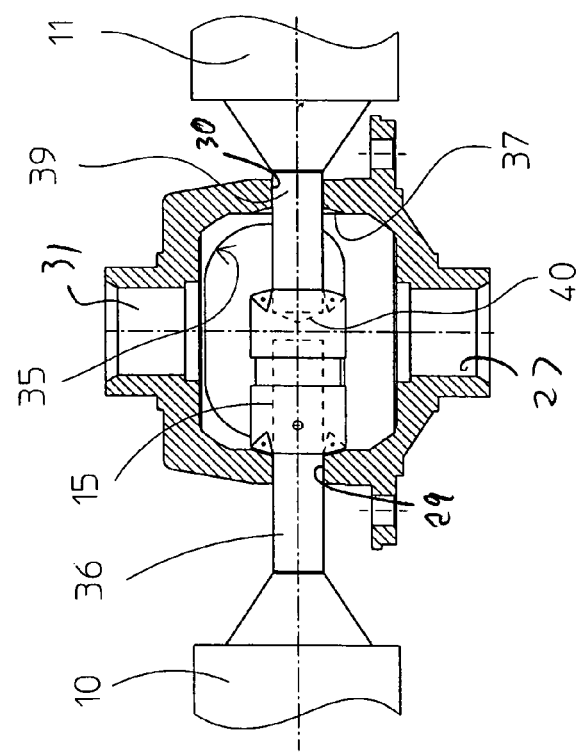
FIG. 5 shows the machining of a radiused seat inside the workpiece.

Then as shown in FIG. 5 the tailstock 11 is advanced in the direction x to engage its centering rod 39 through the hole 30 with a recess 40 in the end of the tool 15. The changers 16 and/or 41 release the tool 15, the drive 10 is started, and the workpiece 9 is shifted away from the drive 10 to machine a part-spherical seat 37 in the interior of the workpiece 9 around the hole 29, then it is oppositely shifted to form another such seat 37 around the hole 30. The tailstock 11 is withdrawn and the tool 15 is withdrawn by the changer 16 from the port 35.

Figure 6:
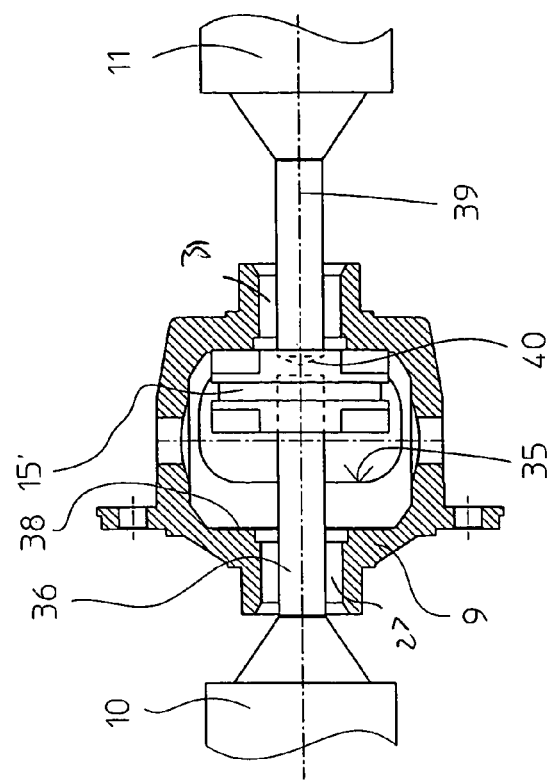
FIG. 6 shows the machining of a flat face inside the workpiece.
Figure 7:
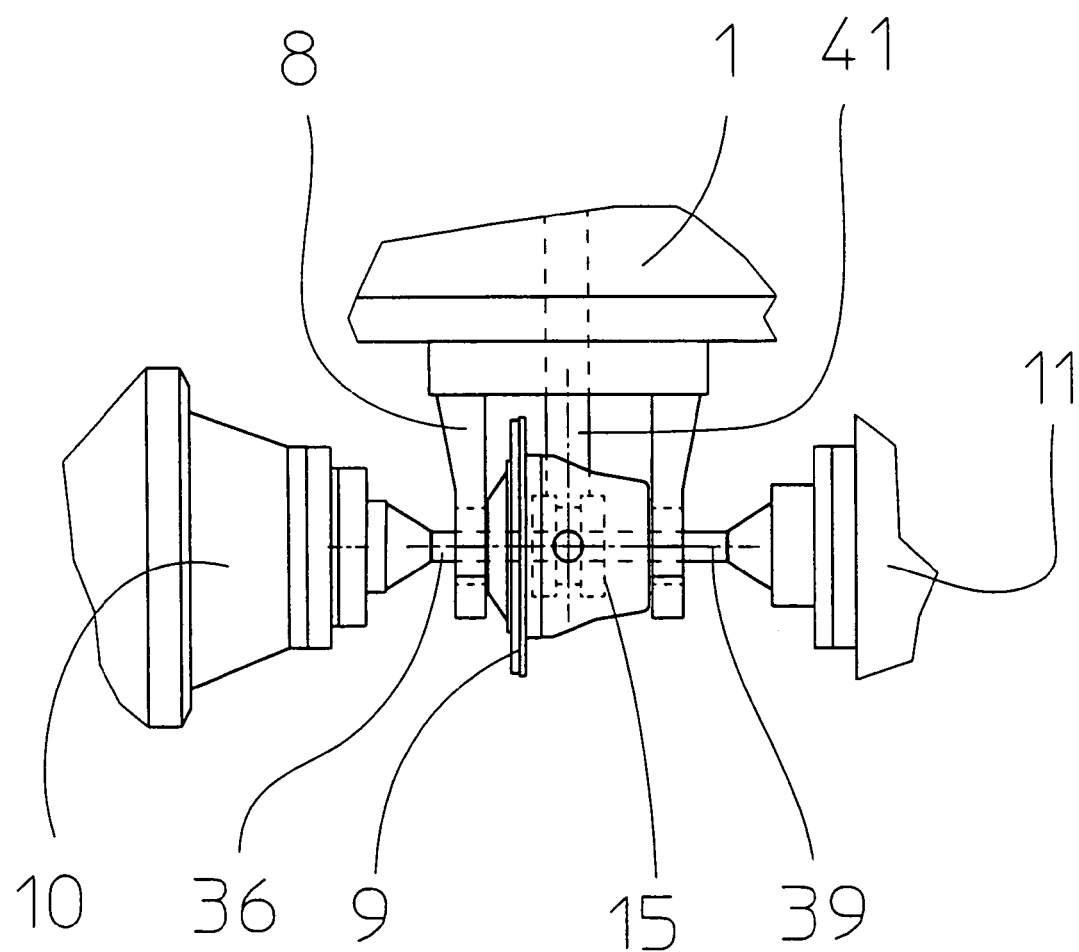
FIG. 7 shows the grab and a tool changer in somewhat more detail.
Figure 8:
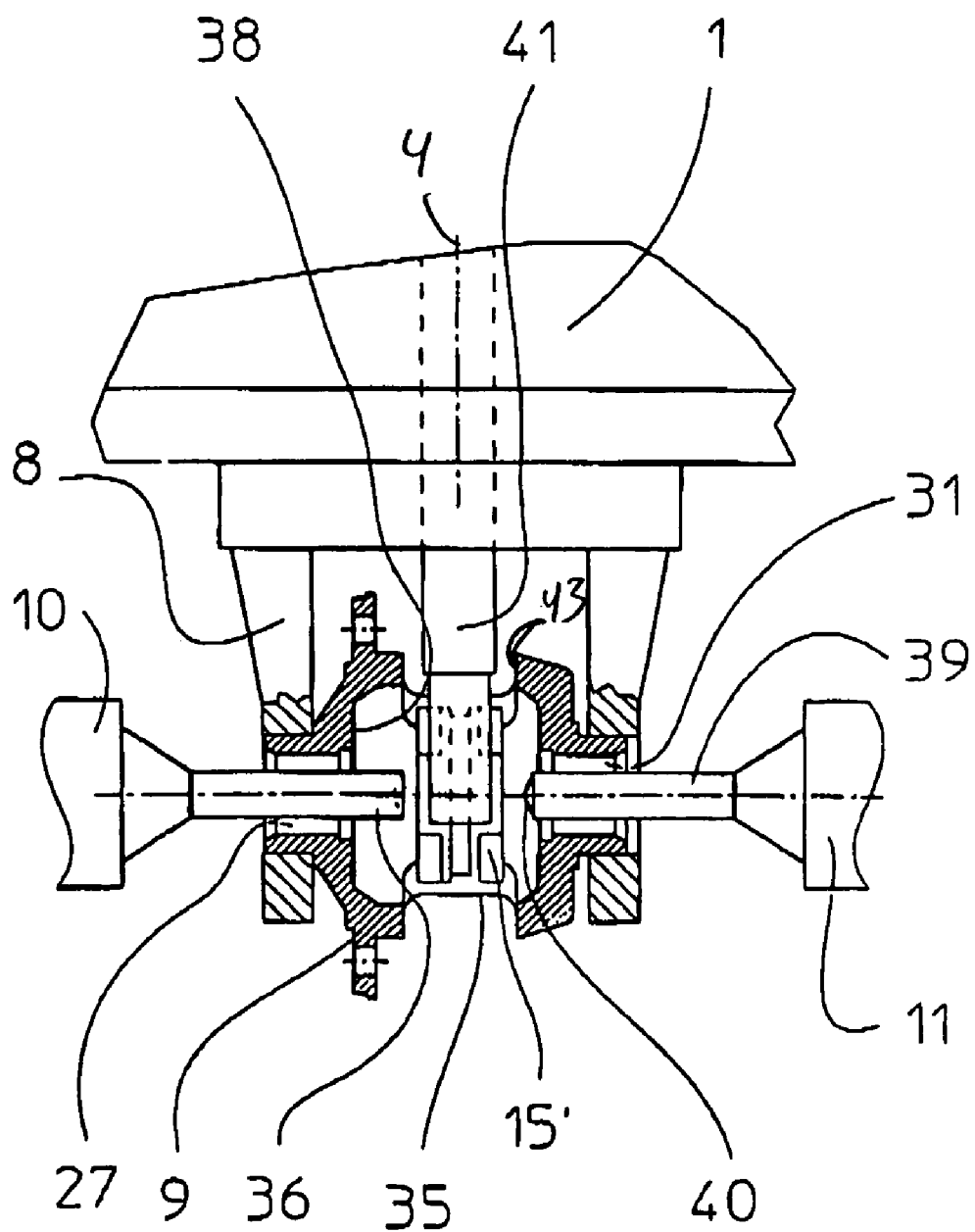
FIG. 8 is sectional view of the structure shown in FIG. 7.

Then as shown in FIGS. 6, 7, and 8 the grab 8 rotates the workpiece 9 through 90° and the step described immediately above is repeated with a larger facing tool 15' to form planar faces 38 inside the workpiece at the holes 27 and 31.

During the entire operation the workpiece 9 is solidly gripped by the grab 8 so that it can be exactly positioned and the various machining operations can be carried out very precisely.

I claim:

1. A method of machining a hollow metal workpiece having a plurality of throughgoing holes and at least one port, the method comprising the steps of:
    picking up from a transfer station by a grab the hollow workpiece and displacing the workpiece out of the transfer station;
    thereafter, while holding the workpiece out of the transfer station with the grab,
    a) engaging a tool from outside with a first exterior surface of the workpiece and thereby finishing the first exterior surface;
    b) reorienting the workpiece by the grab and engaging a second tool with a second exterior surface of the workpiece offset from the first exterior surface and thereby finishing the second exterior surface;
    c) fitting a third tool through the port of the workpiece and positioning the third tool inside the workpiece adjacent one of the holes; and
    d) coupling a drive spindle through the one hole of the workpiece with the third tool and machining an inner surface of the workpiece adjacent the one hole with the third tool; and
    displacing the workpiece back into the transfer station and releasing it from the grab.

2. The machining method defined in claim 1 wherein the first and second exterior surfaces are both surfaces of the holes.

3. The machining method defined in claim 2 wherein the surfaces of the holes are generally cylindrical.

4. The machining method defined in claim 1 wherein in step b) the workpiece is positioned by being rotated about an axis through about 90E.

5. The machining method defined in claim 1, further comprising the step during step d) of engaging a tailstock through another of the holes with the third tool after coupling of the third tool to the drive spindle to brace the third tool.

6. The machining apparatus defined in claim 1, further comprising after step b) and before step c) the step of:

b') shifting the workpiece from a machining station offset from the transfer station to a second machining station offset therefrom by means of the grab; step c) being carried out in the second machining station, the workpiece being displaced after step d) from the second machining station back to the transfer station.

* * * * *